US 6,614,944 B1

(12) United States Patent
Levantovsky

(10) Patent No.: US 6,614,944 B1
(45) Date of Patent: Sep. 2, 2003

(54) IMAGE ENHANCEMENT FILTER WITH ADAPTIVE THRESHOLD

(75) Inventor: Vladimir Levantovsky, North Andover, MA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/499,364

(22) Filed: Feb. 10, 2000

(51) Int. Cl.[7] ................................................. G06T 5/00
(52) U.S. Cl. ........................ 382/261; 382/263; 382/264; 382/266
(58) Field of Search ................................. 382/260, 261, 382/263, 264, 266, 269, 270, 273, 275, 254; 358/447, 463

(56) References Cited

U.S. PATENT DOCUMENTS

| | | | |
|---|---|---|---|
| 5,081,692 A | 1/1992 | Kwon et al. | 382/54 |
| 5,481,628 A | 1/1996 | Ghaderi | 382/261 |
| 5,852,475 A * | 12/1998 | Gupta et al. | 348/606 |
| 5,854,859 A | 12/1998 | Sobol | 382/261 |
| 5,867,606 A | 2/1999 | Tretter | 382/261 |
| 6,407,747 B1 * | 6/2002 | Chui et al. | 345/660 |
| 6,411,305 B1 * | 6/2002 | Chui | 345/660 |
| 6,549,678 B1 * | 4/2003 | Gindele et al. | 382/254 |

* cited by examiner

Primary Examiner—Samir Ahmed
Assistant Examiner—Vikkram Bali
(74) Attorney, Agent, or Firm—Testa, Hurwitz & Thibeault, LLP

(57) ABSTRACT

A method of adaptive spatial filtering for enhancing digital images is presented. A window is applied to a source pixel to generate an array of windowed pixels. An upper threshold value and lower threshold value corresponding to the maximum and minimum pixel values, respectively, in the array of windowed pixels are determined. A spatial frequency filter is applied to the array of windowed pixels to generate a filtered array of pixels including a reference pixel. The values of the source pixel and the reference pixel are scaled by respective weighting factors and then combined to create an enhanced pixel value. If the enhanced pixel value exceeds the upper threshold value, the enhanced pixel value is replaced by the upper threshold value. Similarly, if the enhanced pixel value is less than the lower threshold value, the enhanced pixel value is replaced by the lower threshold value. The resulting array of enhanced values provides greater edge transitions yet does not result in overshoot and undershoot regions which are generated by many traditional edge enhancement methods. In addition, color shifts associated with independent processing of individual color planes are avoided.

20 Claims, 5 Drawing Sheets

IMAGE ENHANCEMENT FILTER WITH ADAPTIVE THRESHOLD

FIELD OF THE INVENTION

The invention relates generally to a method for improving the quality of a digital image. In particular, the invention relates to a method using an adaptive variable threshold to sharpen digital color images.

BACKGROUND OF THE INVENTION

Digital cameras, scanners, copiers and facsimile machines provide images in digital format for subsequent processing and transmission. Often the digital images include noise which results in blurring of the image after filtering. Interpolation of digital images, used to transform a digital image to a desired image size, can also result in blurring of the processed image. Image enhancement techniques are often implemented to improve the image quality by sharpening features in the image. Some image enhancement methods use digital filtering to emphasize, or sharpen, the edges in a digital image. Artifacts, such as ringing, are sometimes apparent in the filtered image, especially for filtering methods which provide greater edge transitions in the processed image. Color images are sometimes sharpened by independently processing the three red-green-blue (RGB) color planes. Unfortunately, this can result in significant color shifts since the high frequency information in one color plane is not necessarily present in the other color planes.

SUMMARY OF THE INVENTION

The present invention relates to adaptive spatial filtering of digital images. The invention overcomes the ringing and color shift problems resulting from use of common image sharpening methods. In one aspect, the invention relates to a method of adaptive spatial filtering for a digital image. The method includes the steps of receiving an array of source pixels and applying a window to the array of source pixels to generate an array of windowed pixels centered on a source pixel. Upper and lower threshold values are determined from the array of windowed pixels. In one embodiment, the upper threshold value and the lower threshold value are determined from the maximum and minimum values in the array of windowed pixels. A spatial frequency filter is applied to the array of windowed pixels to generate a filtered array that includes a reference pixel. The spatial frequency filter can be a low pass filter or a high pass filter. The values of the source pixel and the reference pixel are combined to create an enhanced value. The enhanced value is replaced with the lower threshold value if the enhanced value is less than the lower threshold value. Conversely, the enhanced value is replaced with the upper threshold value if the enhanced value is greater than the upper threshold value.

In one embodiment, the dimensions of the window represent a square. In another embodiment, an array of pixels in one color space are converted to an array of source pixels in a different color space. In another embodiment, the method includes the additional step of applying a first weighting factor to the value of the source pixel and applying a second weighting factor to the value of the reference pixel prior to combining their values.

In another aspect, the invention relates to a system for enhancing a digital image. The system includes a window module, a threshold module and a filter module. The window module provides an array of windowed pixels centered on a source pixel to the threshold module and a filter module. The threshold module determines an upper and a lower threshold and the filter module provides a filtered array of pixels, including a reference pixel. An adder provides an enhanced value that is substantially equal to the combined values of the source pixel and the reference pixel. A comparator module receives the upper and lower thresholds from the threshold module, and the enhanced value from the adder. The comparator provides the value of the reference pixel if the value of the reference pixel does not exceed the upper threshold value and is not less than the lower threshold value. If the value of the reference pixel exceeds the upper threshold value, the comparator provides the upper threshold value. If the value of the reference pixel is less than the lower threshold value, the comparator provides the lower threshold value.

BRIEF DESCRIPTION OF THE DRAWINGS

The foregoing and other objects, features and advantages of the invention are apparent from the following more particular description of preferred embodiments of the invention, as illustrated in the accompanying drawings. The drawings are not necessarily to scale, emphasis instead being placed on illustrating the principles of the present invention.

DESCRIPTION OF THE INVENTION

Figure 1A:
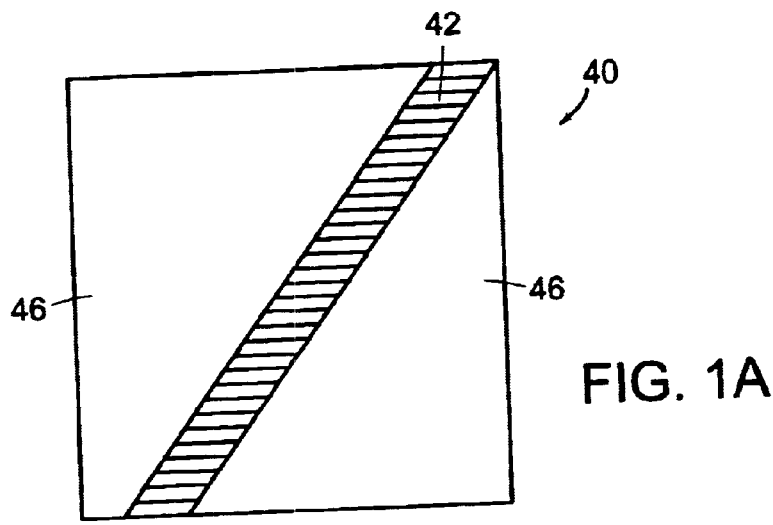
FIGS. 1A to 1C are illustrations of an original color image and edge enhanced color images.

Conventional image enhancement techniques for sharpening transitions often lead to undesirable side effects. FIG. 1A is a representative illustration of a digital color image 40. The image 40 includes a diagonal purple line 42 which is produced as a combination of red and blue color values. The width of the line has been exaggerated for clarity. The image 40 also includes a yellow background 46 which is produced as a combination of red and green color values. The transition from the yellow background 46 to the purple line 42 requires a decrease in the level of green and an increase in the level of blue at the same time.

Figure 1B:
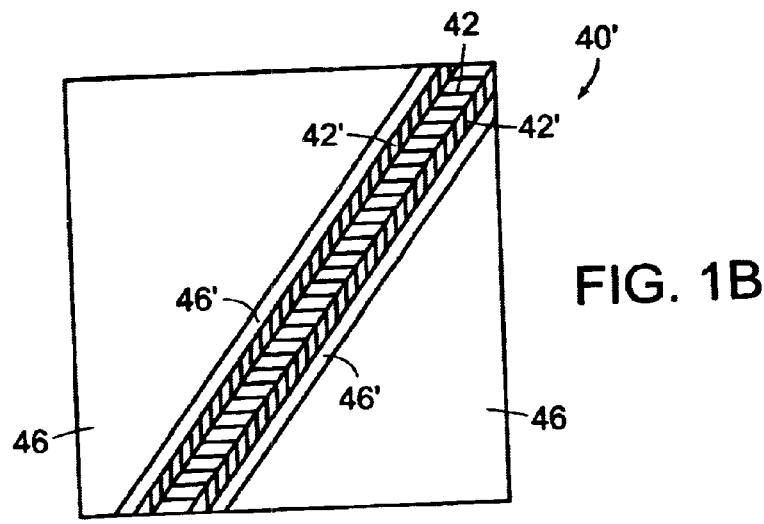

Referring to FIG. 1B, the application of a traditional sharpening method to a RGB color image 40' results in ringing around the edges of the line 42. Ringing results in changes to the original colors of the background 46 and the line 42 in these areas. In particular, the yellow background 46 includes more green near in regions 46' near the edges of the line 42 and the purple line appears more blue in regions 50 near the background 46. Depending on the image features and the image sharpening technique, these color variations can be significant.

Figure 1C:
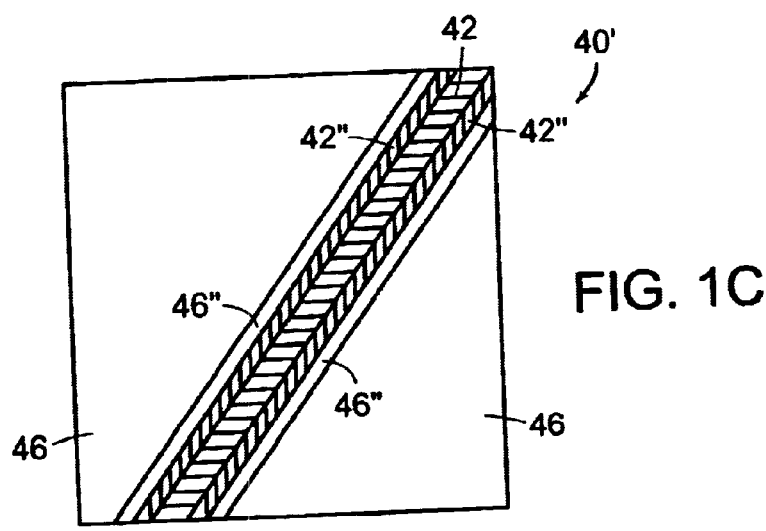

Traditional image enhancement methods used for images defined in luminance-chrominance (LCC) color space also result in undesirable artifacts. Referring to FIG. 1C, sharpening the purple line 42 on the yellow background 46 using a traditional method results in a color variation at the transition between the two original colors. Only the luminance plane (i.e., a gray scale) is sharpened, therefore the purple line 42 is represented in the luminance plane by dark gray and the yellow background is represented in the luminance plane by light gray. The dark gray becomes even darker and the light gray becomes even lighter after application of a traditional sharpening filter. After the sharpened grayscale image is converted back to a color image by merging the chrominance values (i.e., saturation and hue values) and luminance values, the yellow background 46 appears whiter in the regions 46" near the edges of the purple line 42 and the purple line 42 appears as a dull purple in regions 42" near the background 46.

Figure 2A:
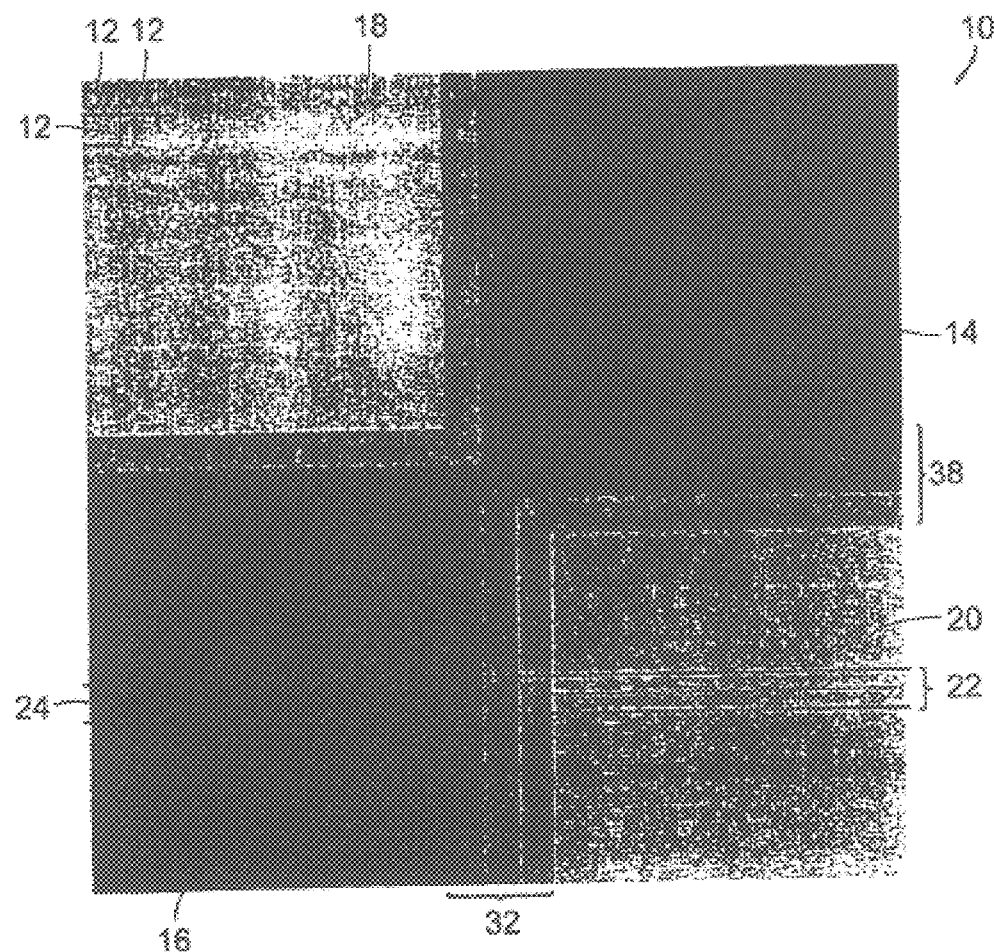
FIGS. 2A and 2B are a grayscale digital image and a diagram of pixel intensity for a horizontal line of pixels in the digital image, respectively.

Referring to FIG. 2A, a digital grayscale image 10 includes an array of pixels 12 (only three identified for clarity) of varying intensities. The image 10 includes an upper right quadrant 14 and a lower left quadrant 16 having relatively low and substantially equal intensities, and an upper left quadrant 18 and a lower right quadrant 20 having relatively high and substantially equal intensities. Transition rows 38 and transition columns 24 have intensity values greater than those of the upper right quadrant 14 and lower left quadrant 16, and lower than those of the upper left quadrant 18 and lower right quadrant 20.

Figure 2B:
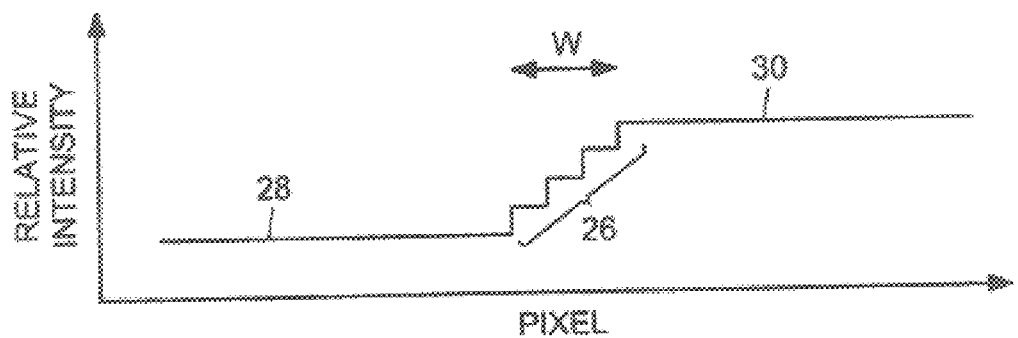

FIG. 2B illustrates the relative intensity of each pixel 12 in a row of pixels 22. The row 22 lies along a horizontal line 24 that passes approximately through the center of the lower left quadrant 16 and the lower right quadrant 20. In order to enhance the image of FIG. 2A, it is desirable to increase the slope of the transition 26 between the low and high intensity regions, 28 and 30, respectively. Referring to FIGS. 2A and 2B, image sharpening is improved if the transition 26 occurs between adjacent pixels (i.e., all pixels have intensities as defined in one of the four quadrants 14, 16, 18 and 20). In such an instance, the transition width w (i.e., the width in pixels to transition from the low intensity region 28 to the high intensity region 30) is zero.

Figure 3A:
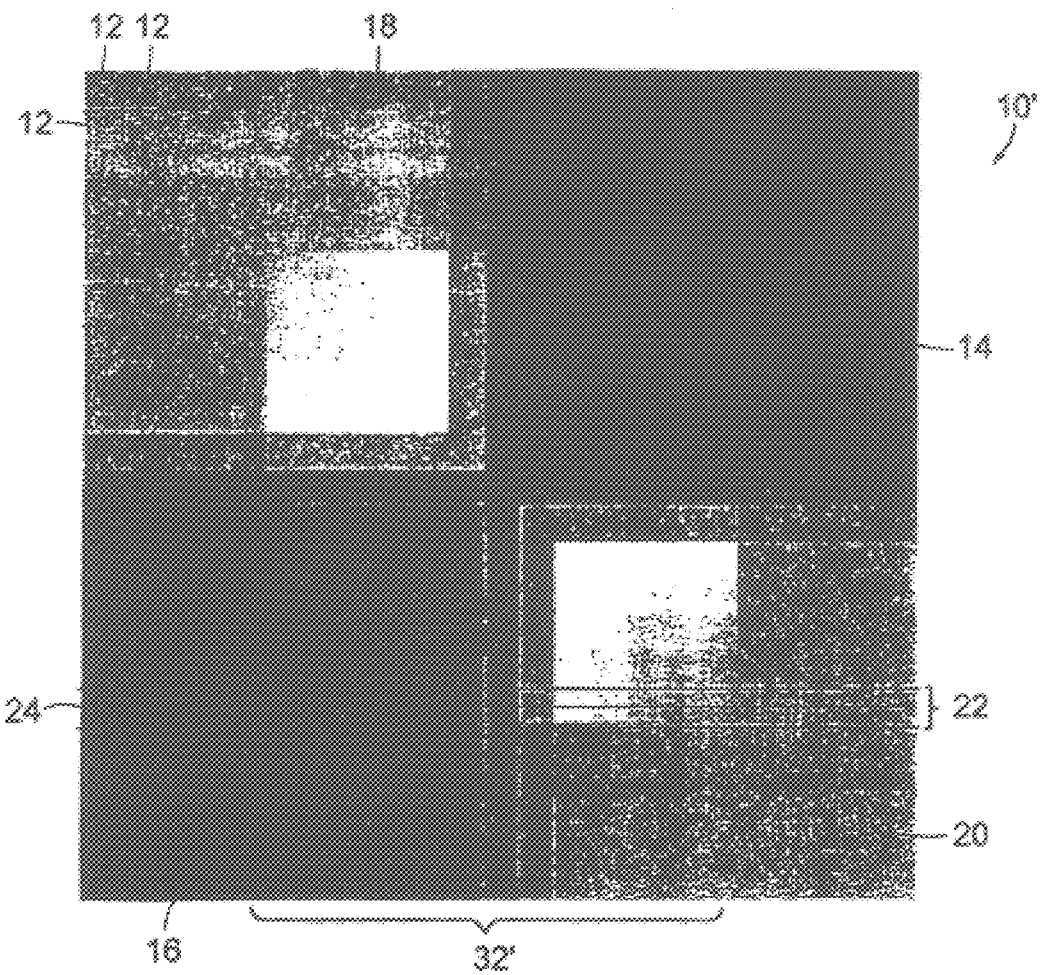
FIGS. 3A and 3B are a grayscale digital image after processing with a traditional spatial filter and a diagram of pixel intensity for a horizontal line of pixels in the processed digital image, respectively.
Figure 3B:
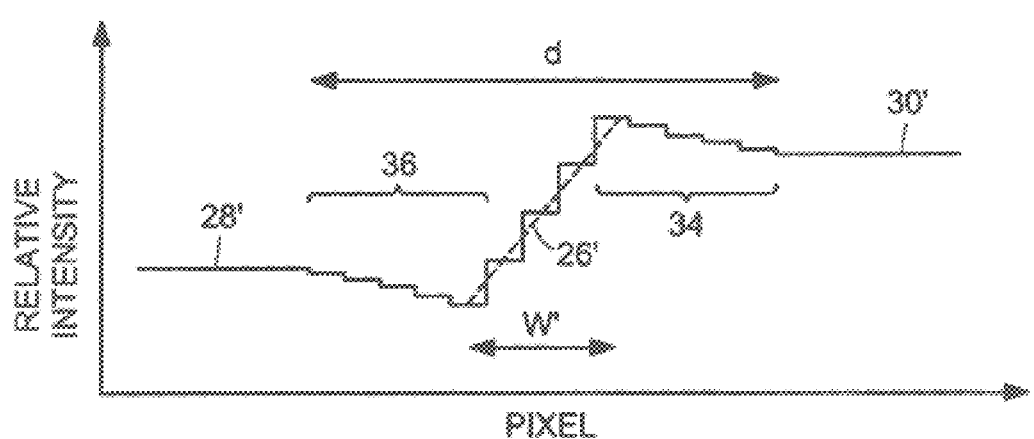

FIG. 3A illustrates the relative intensity of an array of pixels 12 in a modified grayscale image 10' generated by filtering the grayscale digital image 10 of FIG. 2A with an unsharp mask filter as known to the prior art. FIG. 3B illustrates the relative intensity of each pixel 12 in the row of pixels 22 along line 24. The transition width w' is the same as the transition width w for the image 10 of FIG. 2. However, the distance d between the low and high intensity regions 28 and 30, respectively, of the two quadrants 16 and 20, respectively, is greater than the transition width w'. This is a result of the ringing produced by application of the traditional sharpening filter. In particular, overshoot region 34 and undershoot region 36 include pixels 12 having intensities that exceed the maximum and minimum intensity values, respectively, in quadrants 16 and 20, respectively, of the original image 10.

Figure 4A:
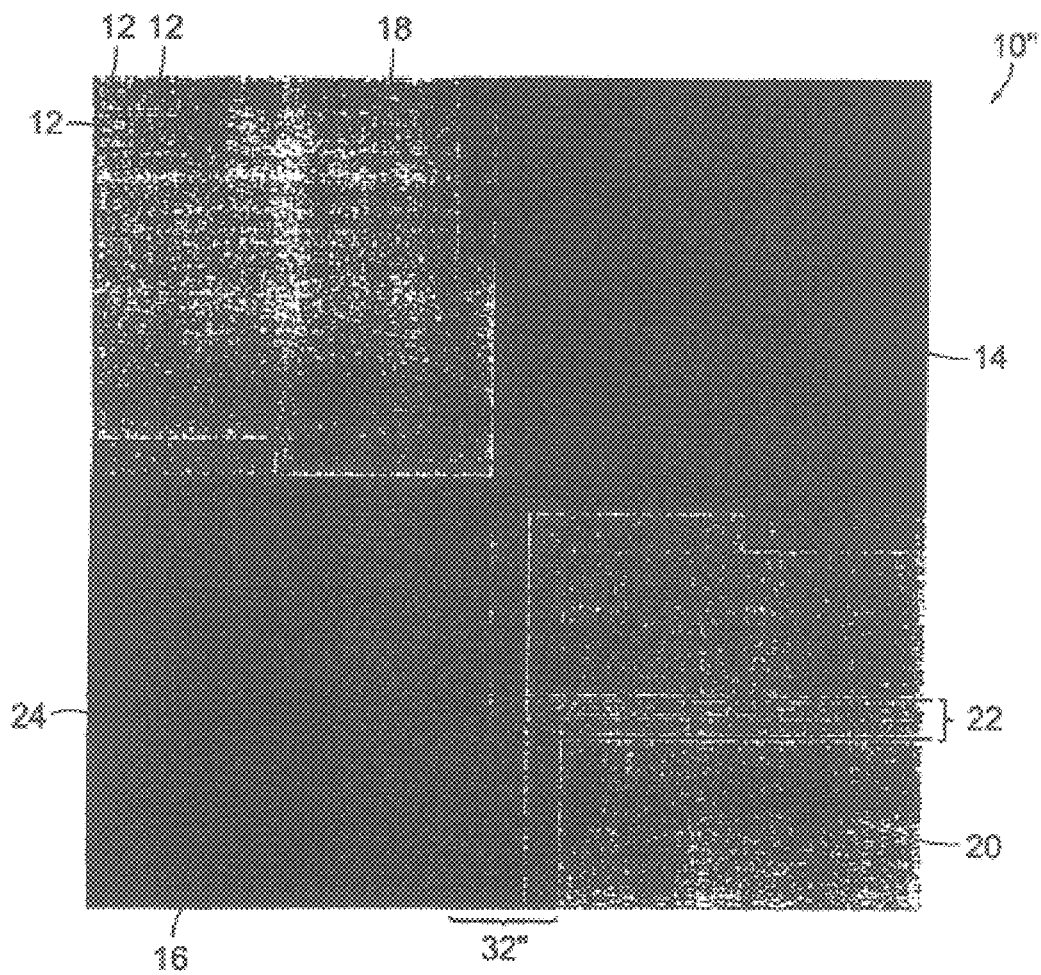
FIGS. 4A and 4B are a grayscale digital image after processing with an adaptive threshold method according to an embodiment of the invention and a diagram of pixel intensity for a horizontal line of pixels in the processed digital image, respectively.
Figure 4B:
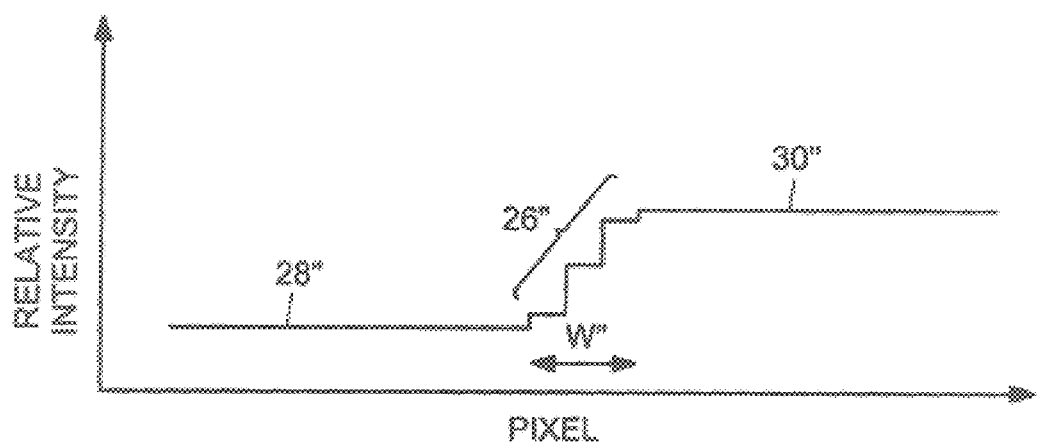

FIGS. 4A and 4B illustrate a grayscale image 10" and the relative intensities for a row of pixels 22 along the horizontal line 24, respectively, after applying the method of the invention to the digital image 10 of FIG. 2A. The transition width w" is equal to the same number of pixels as the transition width w for the image 10 of FIG. 2A. However, the maximum slope of the transition 26" is greater than the maximum slope of the original transition 26. Moreover, there is no ringing present in the filtered image 10".

Figure 5:
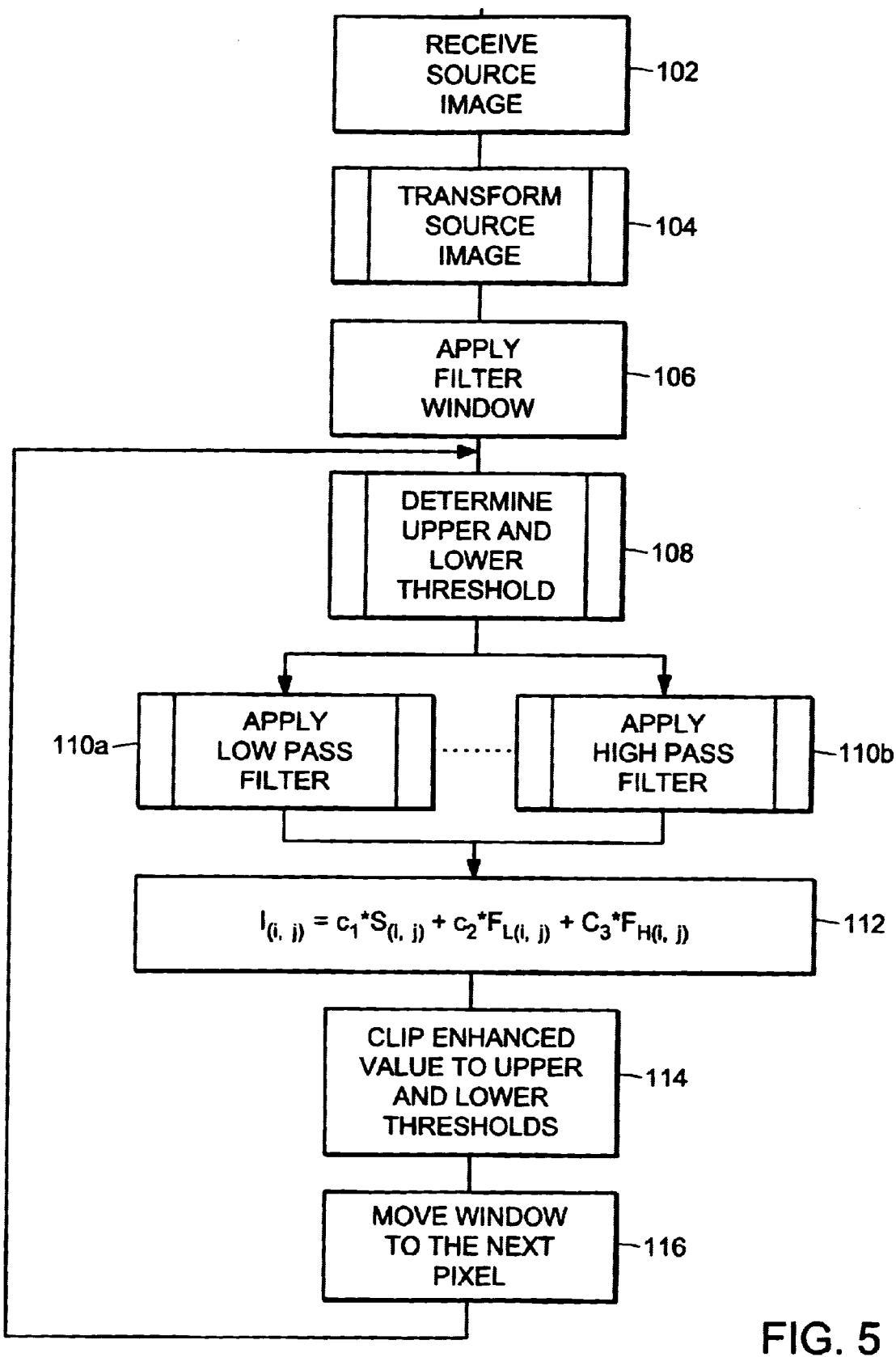
FIG. 5 is a flowchart representation of an illustrative method for image enhancement according to one embodiment of the invention.

The flowchart of FIG. 5 depicts a method for enhancing a digital color image according to one embodiment of the invention. The method includes receiving a source image (step 102) and optionally transforming the source image (step 104). For example, the color coordinates of the digital image can be transformed from one color space to a different color space. In one embodiment the source image is an RGB image and the transformation converts the RGB coordinates to LCC coordinates as is known in the art.

The method includes the additional step of applying a filter window to a pixel in the image to generate an array of windowed pixels (step 106). A square window is generally preferred. However, for applications where data buffering is limited (e.g., video signal processing), a rectangular window can be advantageous. An upper threshold value and a lower threshold value are determined from the values in the array of windowed pixels (step 108). For digital images which are known to have a relatively small noise level, the upper and lower threshold values are the maximum and minimum values, respectively, in the array of windowed pixels. In cases when characteristics of the noise in the source digital image are known, determination of the upper and lower threshold values is performed after applying a noise reduction filter on the array of windowed pixels. For example, a source image having impulse noise can be prefiltered with a median filter prior to determination of the threshold values.

The method also includes the steps 110a and 110b of applying a low pass spatial frequency filter and a high pass spatial frequency filter, respectively, to the array of windowed pixels. In one embodiment, only the low pass filter is applied. In another embodiment, only the high pass filter is applied. Whether to use one or two filters is determined from a priori knowledge of the digital image to be enhanced. The filtered pixel value $S(i,j)$, low pass pixel value $F_L(i,j)$, and high pass pixel value $F_H(i,j)$ are weighted by scale factors C1, C2 and C3, respectively. The resulting scaled values are added to yield an enhanced value $I(i,j)$ (step 112). If the enhanced value $I(i,j)$ is greater than the upper threshold value, the enhanced value $I(i,j)$ is clipped at (i.e., replaced by) the upper threshold value. Similarly, if the enhanced value $I(i,j)$ is less than the lower threshold value, the enhanced value $I(i,j)$ is clipped at the lower threshold value (step 114). The filter window is moved to the next pixel available for processing in the transformed source image (step 116) and the steps of determining upper and lower threshold values, applying at least one spatial frequency filter, combining scaled values and clipping the enhanced value (steps 108, 110, 112 and 114, respectively) are repeated.

The array of enhanced values includes sharper edge transitions yet does not result in overshoot and undershoot regions which are generated by many traditional edge enhancement methods. In addition, color shifts associated with independent processing of individual color planes are avoided.

EQUIVALENTS while the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method of adaptive spatial filtering for a digital image comprising:

receiving an array of source pixels representative of at least a portion of the digital image, each of the source pixels having a value representative of a characteristic of the digital image;

applying a window to the array of source pixels to generate an array of windowed pixels centered on a first source pixel;

determining an upper threshold value and a lower threshold value from the array of windowed pixels;

applying a spatial frequency filter to the array of windowed pixels to generate a filtered array of pixels including a reference pixel;

combining the values of the first source pixel and the reference pixel to create an enhanced value;

replacing the enhanced value with the lower threshold value if the enhanced value is less than the lower threshold value; and replacing the enhanced value with the upper threshold value if the enhanced value is greater than the upper threshold value.

2. The method of claim 1 wherein the window has a window size of M pixels by N pixels.

3. The method of claim 1 wherein the array of source pixels comprises an array of luminance values.

4. The method of claim 1 wherein the array of source pixels comprises an array of one of red, green or blue color values.

5. The method of claim 2 wherein the step of applying a window having a window size of M pixels by N pixels comprises applying a square window.

6. The method of claim 1 wherein the step of receiving an array of source pixels comprises:

receiving an array of pixels representative of at least a portion of the digital image, each of the pixels having a value representative of a characteristic of the digital image in a first color space; and transforming the array of pixels into an array of source pixels, each of the source pixels having a value representative of a characteristic of the digital image in a second color space.

7. The method of claim 6 wherein the array of pixels is a RGB array and the array of source pixels is a luminance-chrominance array.

8. The method of claim 1 wherein the spatial frequency filter is a low pass filter.

9. The method of claim 1 wherein the spatial frequency filter is a high pass filter.

10. The method of claim 1 further comprising the step of applying a first weighting factor to the value of the first source pixel and applying a second weighting factor to the value of the reference pixel prior to combining the values of the first source pixel and the reference pixel.

11. The method of claim 1 wherein the step of applying a spatial frequency filter comprises:

applying a low pass filter to the array of windowed pixels to generate a low pass array of pixels including a low pass pixel value; and applying a high pass filter to the array of windowed pixels to generate a high pass array of pixels including a high pass pixel value.

12. The method of claim 11 wherein the step of combining comprises combining the value of the first source pixel, the low pass pixel value and the high pass pixel value to create an enhanced value.

13. The method of claim 12 further comprising the step of applying a first weighting factor to the value of the first source pixel, applying a second weighting factor to the low pass pixel value and applying a third weighting factor to the high pass pixel value prior to the step of combining the values.

14. The method of claim 1 further comprising repeating, for a second source pixel in the array of source pixels, the steps of applying the window, determining the upper and lower threshold values, applying the spatial frequency filter, combining the values and replacing the enhanced value.

15. The method of claim 1 wherein the step of determining an upper threshold value and a lower threshold value comprises determining a maximum value and a minimum value from the array of windowed pixels.

16. The method of claim 15 wherein the step of determining an upper threshold value and a lower threshold value further comprises the step of removing extreme values prior to determining a maximum value and a minimum value in the array of windowed pixels.

17. The method of claim 1 wherein the step of determining an upper threshold value and a lower threshold value is responsive to the source of the digital image.

18. A system for enhancing a digital image, comprising:

a window module having an input to receive an array of source pixels and an output for providing an array of windowed pixels centered on a source pixel;

a threshold module for determining an upper threshold value and a lower threshold value, the threshold module having an input in electrical communication with the output of the window module, the threshold module having a first output to provide an upper threshold value and a second output to provide a lower threshold value;

a filter module having an input in electrical communication with the output of the window module and an output to provide a spatially filtered array of pixels comprising a reference pixel;

an adder having a first input in electrical communication with the input of the window module, a second input in electrical communication with the output of the filter module and an adder output, the adder providing an enhanced value at the adder output substantially equal to the combined values of the source pixel and the reference pixel;

a comparator module having a first input in electrical communication with the first output of the threshold module, a second input in electrical communication with the second output of the threshold module, a third input in electrical communication with the output of the adder, and a comparator output, the comparator providing the value of the reference pixel at the comparator output if the value of the reference pixel does not exceed the upper threshold value and is not less than the lower threshold value, the comparator providing the upper threshold value at the comparator output if the value of the reference pixel exceeds the upper threshold value, the comparator providing the lower threshold value at the comparator output if the value of the reference pixel is less than the lower threshold value.

19. The system of claim 18 wherein the filter module comprises a high pass filter.

20. The system of claim 18 wherein the filter module comprises a low pass filter.

* * * * *